(12) United States Patent
Stell et al.

(10) Patent No.: US 7,185,678 B1
(45) Date of Patent: Mar. 6, 2007

(54) ORIFICE PLATE DIFFUSER

(75) Inventors: James Dennis Stell, Wichita Falls, TX (US); Stephen Eric Witt, Amherst, NY (US)

(73) Assignee: Nitram Energy, Inc., Orchard Park, NY (US)

( * ) Notice: Subject to any disclaimer, the term of this patent is extended or adjusted under 35 U.S.C. 154(b) by 141 days.

(21) Appl. No.: 10/734,053

(22) Filed: Dec. 11, 2003

(51) Int. Cl.
*F15D 1/02* (2006.01)

(52) U.S. Cl. .......................... 138/41; 138/42; 181/252; 181/256

(58) Field of Classification Search ................ 181/252, 181/227, 256; 138/41, 42
See application file for complete search history.

(56) References Cited

U.S. PATENT DOCUMENTS

| | | | | |
|---|---|---|---|---|
| 1,404,652 A * | 1/1922 | Rohnow | .................... | 48/189.6 |
| 2,225,990 A * | 12/1940 | Henry | .......................... | 96/118 |
| 2,508,224 A * | 5/1950 | Carter | .......................... | 138/42 |
| 3,217,750 A * | 11/1965 | Thomas | ....................... | 138/41 |
| 3,247,665 A * | 4/1966 | Behrens | ....................... | 60/292 |
| 3,495,950 A * | 2/1970 | Barber et al. | ............... | 422/171 |
| 3,521,429 A * | 7/1970 | Leffler | .......................... | 96/383 |
| 3,724,502 A * | 4/1973 | Hayner et al. | ................ | 138/41 |
| 3,733,792 A * | 5/1973 | Taylor | .......................... | 55/488 |
| 3,884,037 A * | 5/1975 | Barber et al. | ................. | 60/292 |
| 3,898,063 A * | 8/1975 | Gazan | ......................... | 96/384 |
| 3,960,239 A * | 6/1976 | Frochaux et al. | ........... | 181/258 |
| 4,113,050 A * | 9/1978 | Smith | ......................... | 181/230 |
| 4,361,423 A * | 11/1982 | Nitz | .............................. | 96/1 |
| 4,530,417 A * | 7/1985 | Daniel | ........................ | 181/223 |
| 5,166,479 A * | 11/1992 | Gras et al. | ................... | 181/256 |
| 5,173,021 A * | 12/1992 | Grainger et al. | ............ | 415/119 |
| 5,298,046 A * | 3/1994 | Peisert | ........................ | 55/486 |
| 5,523,062 A * | 6/1996 | Hearn et al. | ................ | 422/195 |
| 5,881,702 A * | 3/1999 | Arkfeld | ....................... | 123/538 |

* cited by examiner

*Primary Examiner*—James Hook
(74) *Attorney, Agent, or Firm*—Simpson & Simpson, PLLC

(57) ABSTRACT

A noise reducing device for a pressurized fluid stream, i.e., a gas, includes a housing. An inlet end and an outlet end of the housing each have at least one orifice for passing a fluid therethrough. The inlet end orifice includes an inlet face and an outlet face and the inlet end orifice is configured for maintaining a backpressure upstream of the inlet end orifice. A diffusing pack material is disposed within the housing. One or more stiffeners may be disposed within the diffusing pack material to ensure that the diffusing pack material maintains contact with the outlet face of the inlet end orifice and/or to prevent the migration of the diffusing pack material within the housing, thereby maintaining a homogeneous distribution of the pack material.

19 Claims, 9 Drawing Sheets

ORIFICE PLATE DIFFUSER

FIELD OF THE INVENTION

The present invention relates generally to acoustical silencers, and more particularly, to devices for minimizing the incidence of formation of acoustic waves in high-pressure fluid streams.

BACKGROUND OF THE INVENTION

Many industrial processes require the release of high-pressure fluids to the atmosphere. The high-pressure fluids released typically comprise steam and gases that are expelled through vent or blow down systems of steam turbines, steam piping systems, and natural gas storage and compressor stations. Vent systems are typically characterized by a relatively constant flow of pressurized gas whereas blowdown systems are characterized by the release of fixed volumes of gas. Vent and blowdown systems can range in diameter from only a few inches to many feet and may vary in length from a few feet to upwards of forty feet or more. In most cases, high-pressure fluid releases cause the formation of turbulent jet flow, which results in the formation of excessive noise levels that can exceed over 120 decibels (dB). In effect, the noise created by such high-pressure releases is equivalent to that created by the engines of jet airplanes.

The exposure to such excessive noise levels can result in permanent ear damage and/or permanent hearing loss. For this reason, laws, regulations and guidelines exist to protect individuals in the workplace and to protect those living near industrial settings from exposures to such high levels of noise. For instance, the Occupational Safety and Health Act (OSHA) of 1970 specifically relates to the occupational exposure of workers to excessive noise and the Noise Control Act of 1972 mandates the Environmental Protection Agency (EPA) establish noise limits that are protective of public health and welfare. In addition to federal regulatory efforts, various states and cities have enacted laws, regulations and guidelines that establish acceptable maximum noise levels acceptable at or near industrial settings. These levels typically vary according to whether an area is zoned as being heavy industrial, commercial, residential, etc. Hence, most industrial facilities in the United States include sound control and/or sound abatement devices to control noise levels.

Heretofore, control of most noise has been typically achieved by means of isolating the noise and/or dissipating noise after formation utilizing sound absorption materials, acoustic shields and barriers (fixed and movable), acoustic enclosures, or by the use of diffusers. Diffusers typically distribute the flow of fluids streams evenly through the inlet portion of a silencer and shift the noise to a frequency that can be attenuated by the remainder of the silencer assembly. Diffusers, thus, contribute little to the actual attenuation of the noise generated by the fluid stream. On the contrary, some diffusers comprising a series of closely spaced, nested and perforated pipes impart a tortuous path upon the flow of the fluid stream and provide some reduction in the levels of noise. However, the level of noise reduction provided by such diffusers is minimal.

Significant reductions in the level of noise produced in industrial settings can be achieved by preventing the very formation of turbulent jet fluid streams that produce excessive noise. Additionally, preventing the formation of turbulent fluid jet streams can be more cost effective as sound absorptive, attenuation and/or deflection devices may no longer be needed.

Additionally, many sound attenuation devices comprise acoustic pack materials that are not satisfactory for high temperature or high pressure applications. Moreover, many acoustic pack materials tend to migrate or break down within the device housing, which reduces the efficacy of the noise attenuation device.

What is needed then is a noise attenuation device for high pressure, high temperature fluid flow applications that comprises a pack material that is resistant to breakdown and migration and which prevents the initial formation of turbulent jet flow such that additional sound absorption, attenuation and/or deflection devices is not required.

SUMMARY OF THE INVENTION

The present invention broadly comprises a noise reducing device for diffusing a pressurized fluid stream, i.e., a gas, and generally comprises a housing having an inlet end and an outlet end. The inlet end and the outlet end each includes at least one orifice for passing a fluid therethrough. The inlet end orifice includes an inlet face and an outlet face and the inlet end orifice is operatively arranged to maintain a back-pressure upstream of the inlet end orifice. The device further includes a diffusing pack material disposed within the housing, which maintains contact with the outlet face of the inlet end orifice. The device may be further adapted to comprise one or more stiffener means disposed within the diffusing pack material. The stiffener means ensure that the diffusing pack material maintains contact with the outlet face of the inlet end orifice and further prevents the migration of the diffusing pack material within the housing, thus, maintaining a homogeneous distribution of the diffusing pack material.

It is therefore an object of the present invention to provide a noise reducing device for reducing noise levels in industrial settings;

Another object of the present invention is to minimize the incidence of formation of turbulent jet air-flow in pressurized fluid systems; and, A further object of the present invention is to provide a noise reducing device capable of withstanding high temperature and high pressure applications typically associated with industrial vent and blowdown systems that dispenses with the need for additional sound absorptive, attenuation or deflection devices.

The present invention relates to the above features and objects both individually and collectively and these and other objects, features and advantages of the present invention will become apparent to those having ordinary skill in the art upon study of the following detailed description in view of the drawings and claims.

BRIEF DESCRIPTION OF THE DRAWINGS

The nature and mode of operation of the present invention will now be more fully described in the following detailed description of the invention in view of the accompanying drawing figures, in which.

DETAILED DESCRIPTION OF THE INVENTION

At the outset, it should be appreciated that like reference numbers on different drawing figures represent identical, or functionally similar, structural elements. It should also be appreciated that, while a number of different embodiments and variations of the present invention are shown in the various drawings, the invention as claimed is not intended to be limited to these specific embodiments as the claims define a broader invention that can take many different shapes and structures. In the detailed description and claims that follow, the term "fluid", as in "fluid stream" is generally intended to connote a gas or a gas stream. In the detailed description and claims that follow, the phrase "diffusing pack material" is primarily intended to refer to a layered, knitted wire mesh, as described infra, but may also be used to refer to a stiffener means. i.e., a wire screen, or combinations thereof. Additionally, it should be appreciated by those having ordinary skill in the art that while industrial pressurized systems are typically viewed as comprising those systems wherein internal system pressures exceed 500 psig, in reality a pressurized system may comprise a system wherein the internal system pressure exceeds atmospheric pressure. Finally, it should be appreciated that the present invention may be configured to comprise weatherhoods, bird screens, directional outlets and the like.

Figure 1:
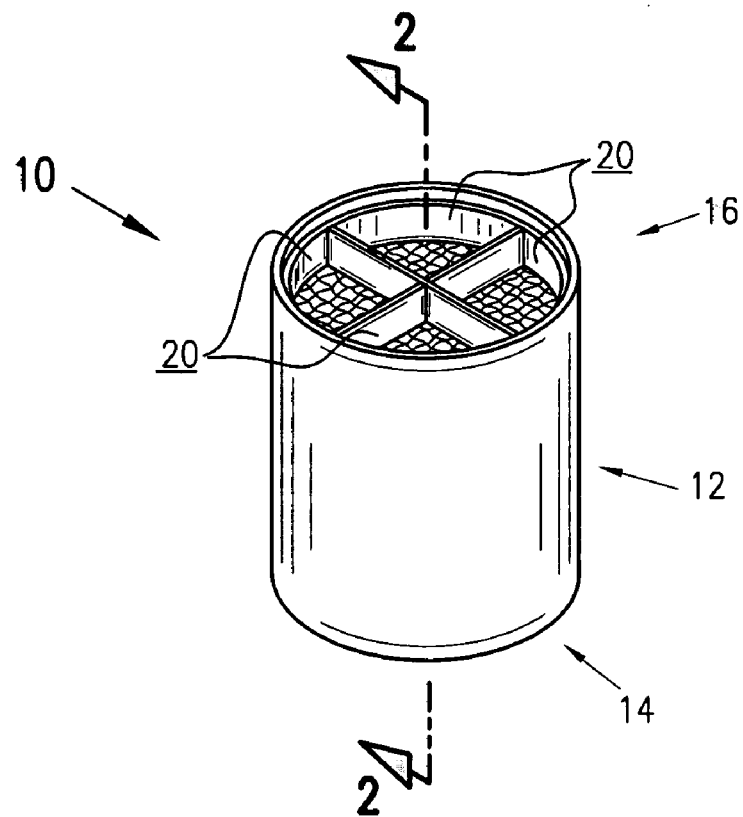
FIG. 1 is a perspective view of a diffuser according to the present invention.
Figure 2:
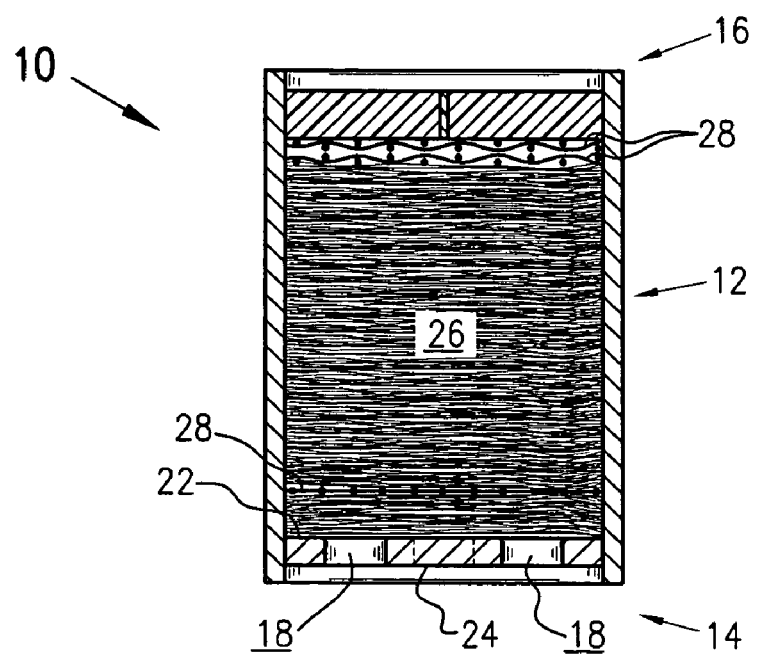
FIG. 2 is a cross-sectional view of the diffuser of FIG. 1 taken generally along line 2—2 of FIG. 1.
Figure 3:
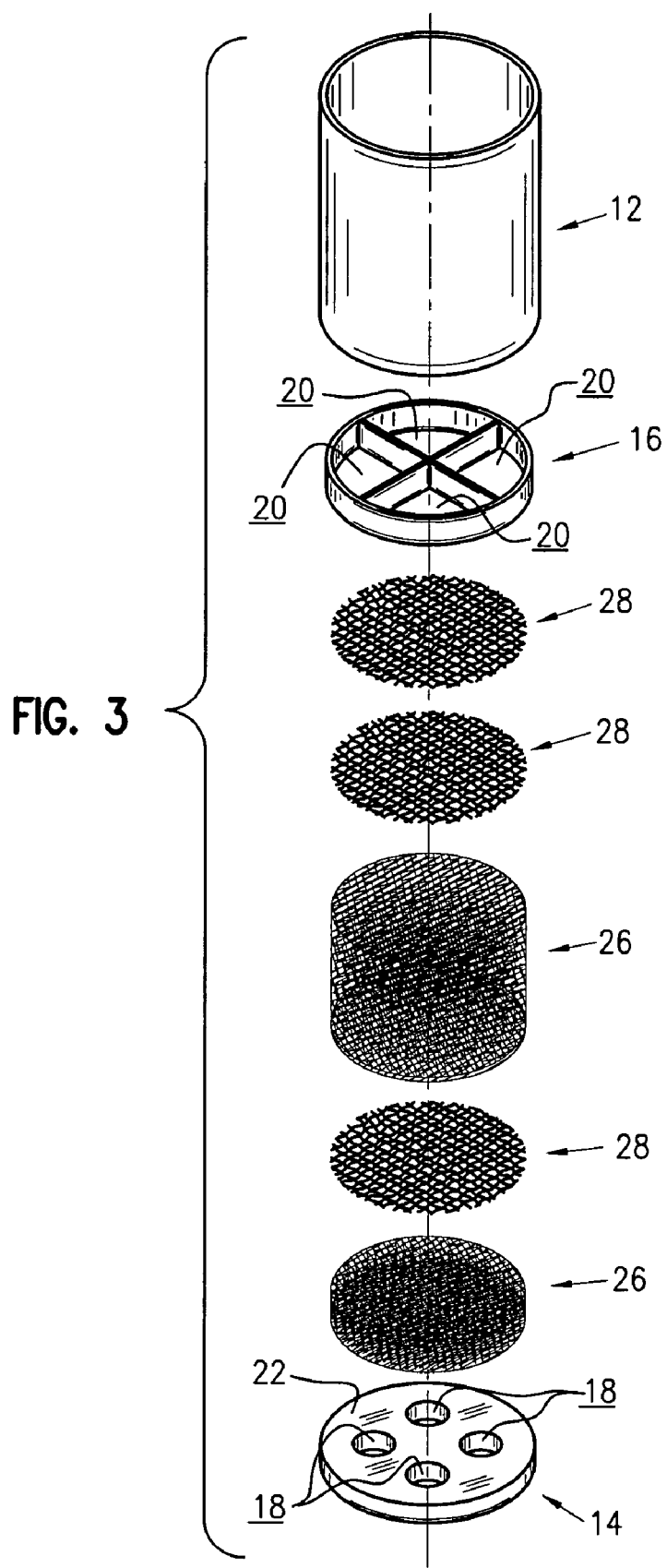
FIG. 3 is an exploded view of the diffuser illustrated in FIGS. 1 and 2.
Figure 4:
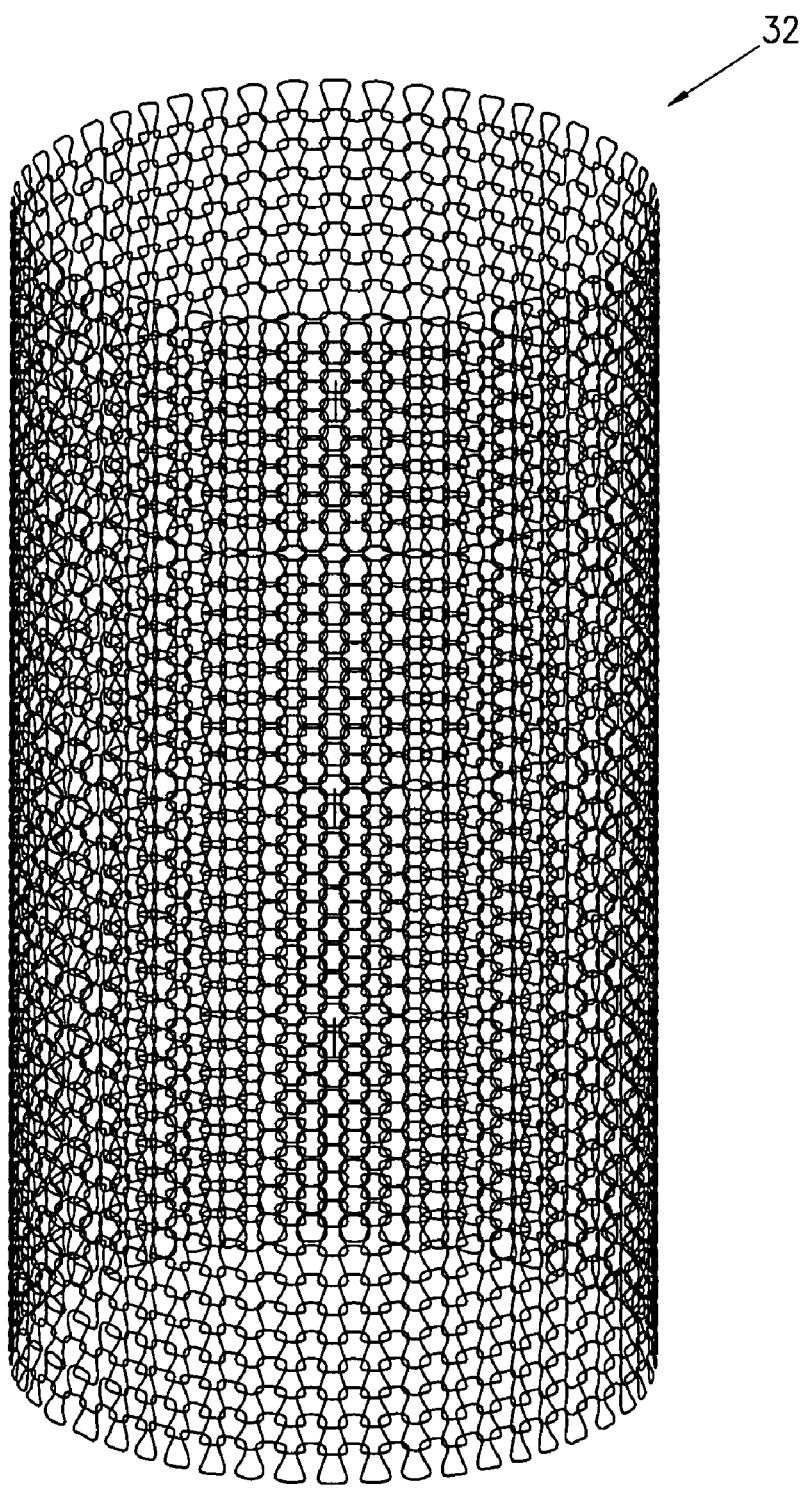
FIG. 4 is a perspective view of diffusing pack material according to the present invention.
Figure 5:
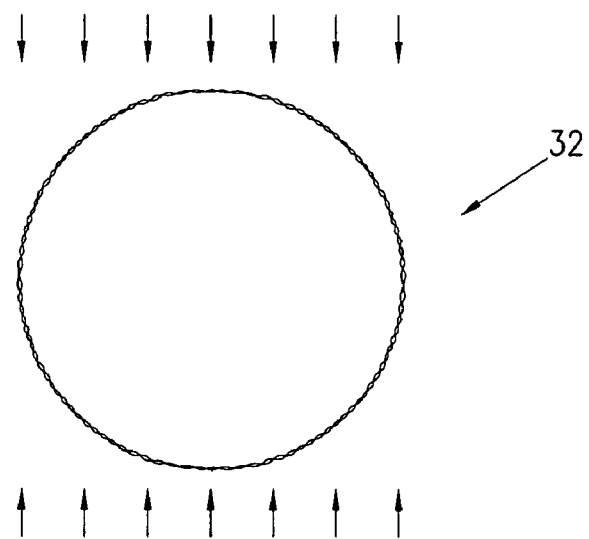
FIGS. 5–9 illustrate a method by which the diffusing pack material of the present invention may be folded.
Figure 6:
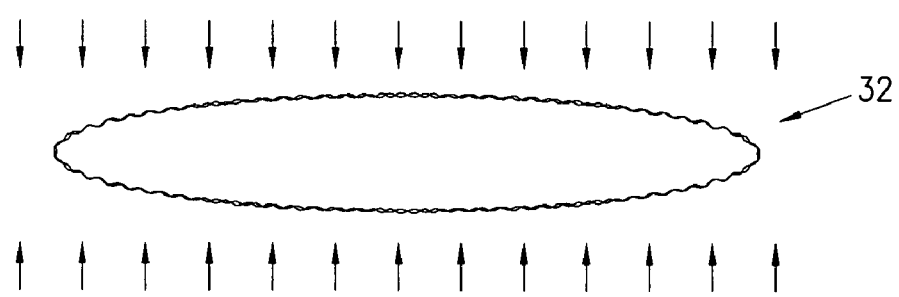

Adverting now to the Figures, FIGS. 1–3 illustrate noise reducing device 10 according to the present invention as broadly comprising housing 12, inlet end 14, and outlet end 16 for securing diffusing pack material 26.

As illustrated more clearly in FIGS. 2 and 3, inlet end 14 and outlet end 16 each comprise one or more orifices 18 and 20, respectively, operatively arranged for the intake and exhaust of a pressurized fluid (gas). In a preferred embodiment, the area of inlet end orifice 18 and the area of outlet end 20 orifice are sized such that back pressure is maintained on the upstream side of the inlet end orifice for optimum sound attenuation. While optimum noise attenuation is typically achieved at higher back pressures, i.e., back pressures greater than 250 psig, noise attenuation benefits have been achieved with the present invention at backpressures as low as 5 psig.

Figure 7:
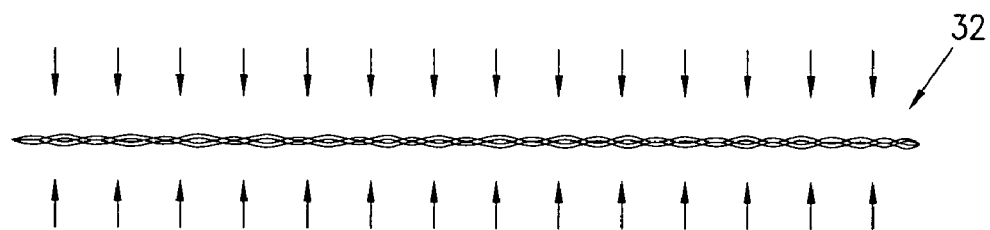
Figure 8:
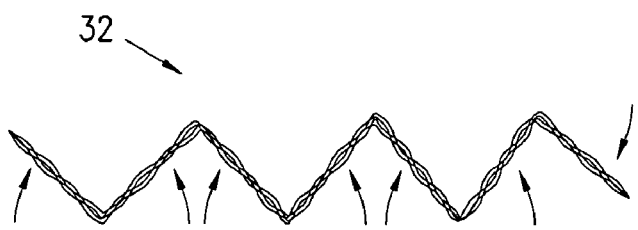
Figure 9:
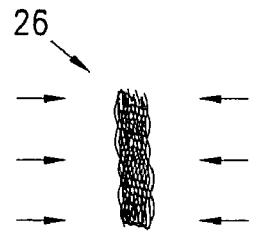

Disposed within housing 12, between the inlet and the outlet ends is diffusing pack material 26. As illustrated in FIGS. 4–9, diffusing pack material 26 is preferably formed from knitted wire mesh 32. In a preferred embodiment, knitted wire mesh 32 comprises a cylindrically shaped wire mesh formed from a monofilament wire having a diameter of between 0.0006 and 0.011 inches. However, it should be appreciated by those having ordinary skill in the art that other gauge knitted wire mesh may be utilized for achieving noise attenuation benefits as may be desired. To form diffusing pack material 26, knitted wire mesh 32 is folded upon itself to form a flat, two-ply sheet as shown in FIG. 7. Thereafter, the flat, two-ply sheet is then, preferably, folded upon itself in an accordion like fashion as shown in FIG. 8 so to form one or more wire mesh pads (diffusing pack material 26) as shown in FIG. 9. The wire mesh pad(s) are then inserted into the housing, one on top of the other, to a desired density, preferably between 35 and 45 lbs. per cubic foot. Because industrial gas applications and like systems typically comprise high pressures and high temperatures, or steam or corrosive gases, it is preferred that the knitted wire mesh comprise a material that is resistant to such extreme conditions. Hence, it may be preferable, for example, in a steam application to utilize a knitted wire mesh comprising stainless steel.

Diffusing pack material 26 is disposed within the housing, such that it maintains contact with outlet face 22 of inlet end 14 and inlet end orifice 18. Optimal noise attenuation is largely dependent upon the diffusing pack material maintaining contact with outlet face 22 of the inlet end orifice. Also, it is important that a homogenous distribution of the diffusing pack material be maintained. Hence, diffusing pack material 26 may be configured to further comprise one or more stiffener means 28 disposed within the diffusing pack material. In a preferred embodiment, the stiffener means comprise a rigid wire screen that prevents the diffusing pack material from migrating within the housing or from becoming deformed. The stiffener means also ensures that the diffusing pack material maintains contact with outlet face 22 of the inlet end for achieving optimal noise attenuation. Similar to the layered wire mesh, stiffener means 28 may be constructed from appropriate materials that are suitable for high temperature and high pressure fluid applications, i.e., stainless steel for steam applications.

Figure 10:
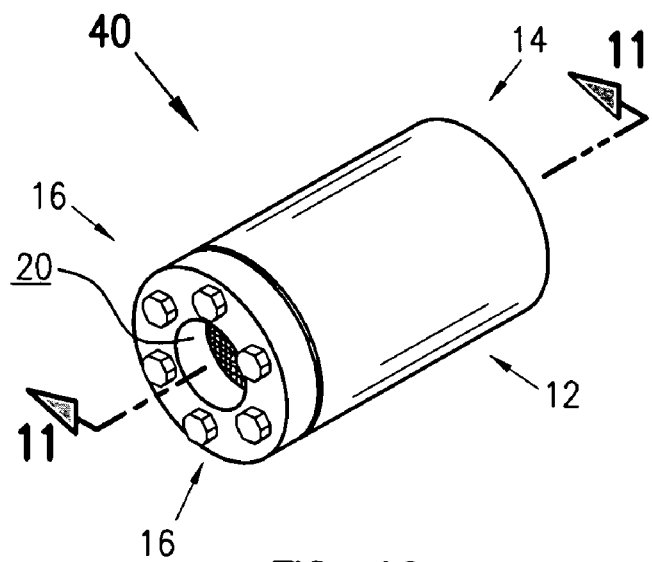
FIG. 10 is a perspective view of an alternative embodiment of a diffuser according to the present invention.
Figure 11:
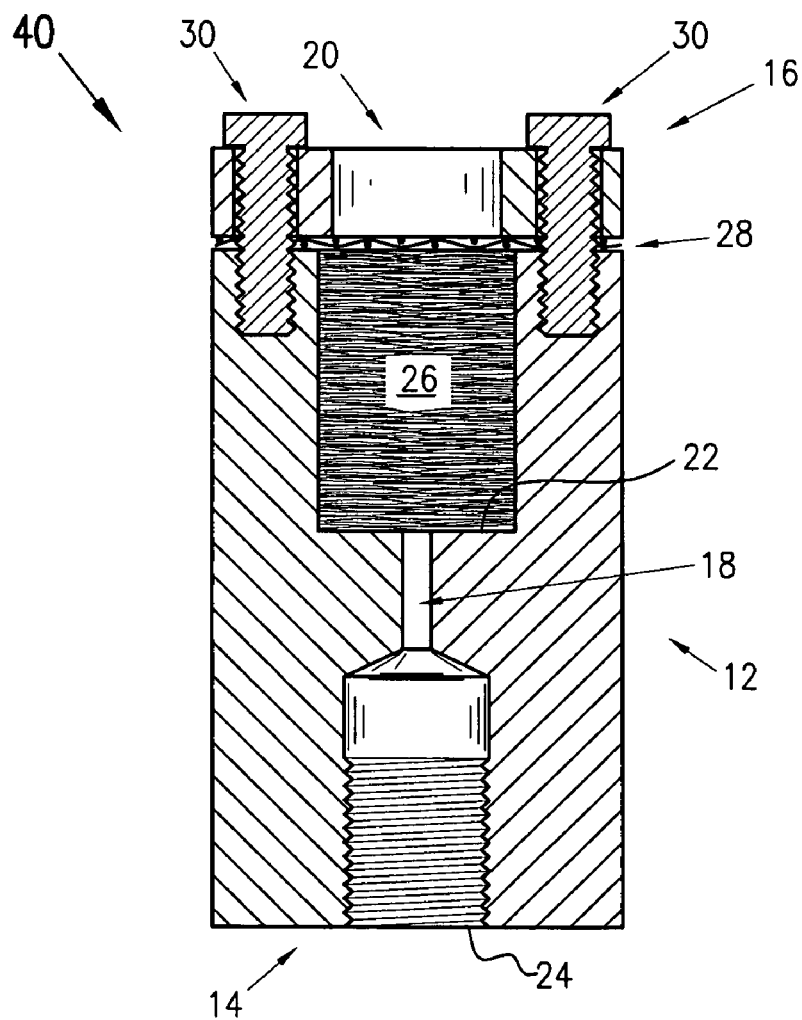
FIG. 11 is a cross-sectional view of the diffuser of FIG. 10, taken generally along line 12—12.
Figure 12:
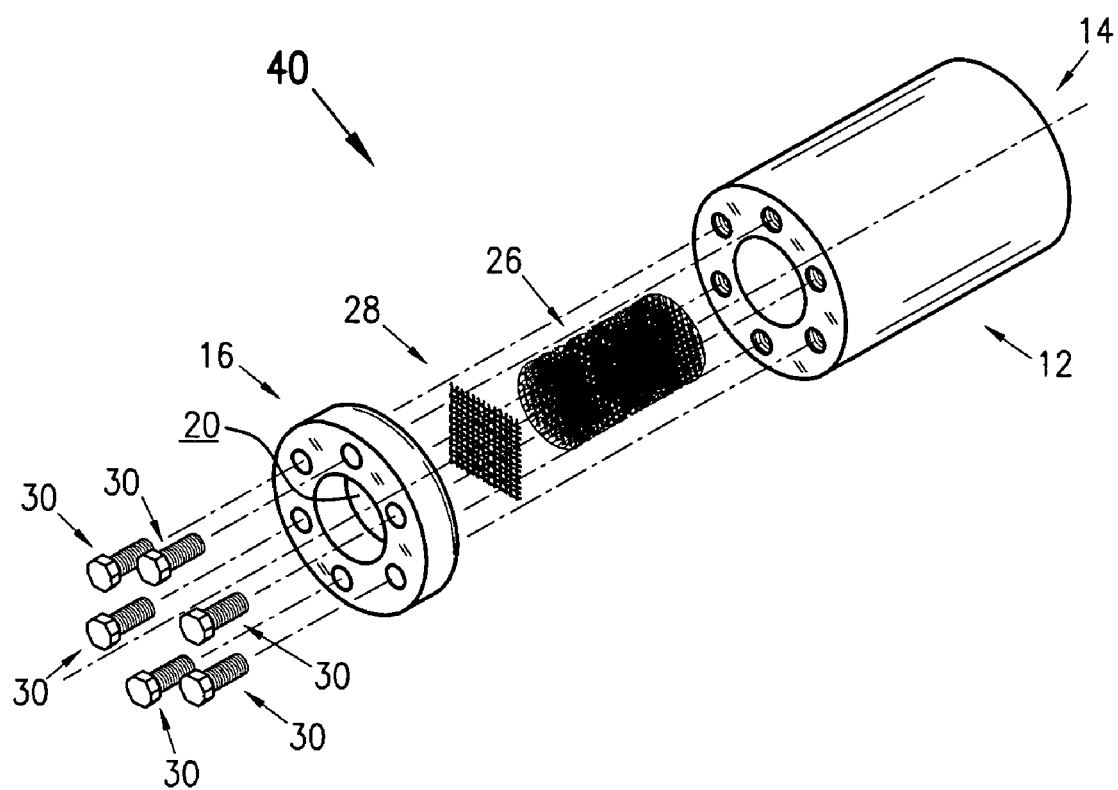
FIG. 12 is an exploded view of the diffuser of FIG. 10.

Referring now to FIGS. 10–12, the present invention may be adaptable for inline use as well as at the end of a pressurized system. In this embodiment, noise reducing device 40 is seen to be similar to noise reducing device 10 in that it comprises housing 12, inlet end 14, outlet end 16 and diffusing pack material 26. However, outlet end 16 is shown as being releasably securable to the housing by means of a plurality of fasteners 30, which in this case comprise a plurality of bolts. In this arrangement, the noise reducing device is primarily configured for end use at the end of a pressurized system. However, noise reducing device 40 may be readily adapted for inline use and configured to accept a flanged pipe (not shown) or the like, which may be fastened to the outlet end by means of fasteners 30. In FIGS. 10–12 it is also seen that noise reducing device 40 may be adapted to comprise a single inlet orifice 18. Furthermore, FIGS. 10–12 illustrate that in smaller diameter and smaller axial length systems, because the cavity containing the diffusing pack material 26 is smaller, only one stiffening means 28 may be required. Thus, FIGS. 10–12 illustrate that a single stiffening means may be disposed within the housing proximate the outlet end to achieve suitable noise attenuation.

Figure 13:
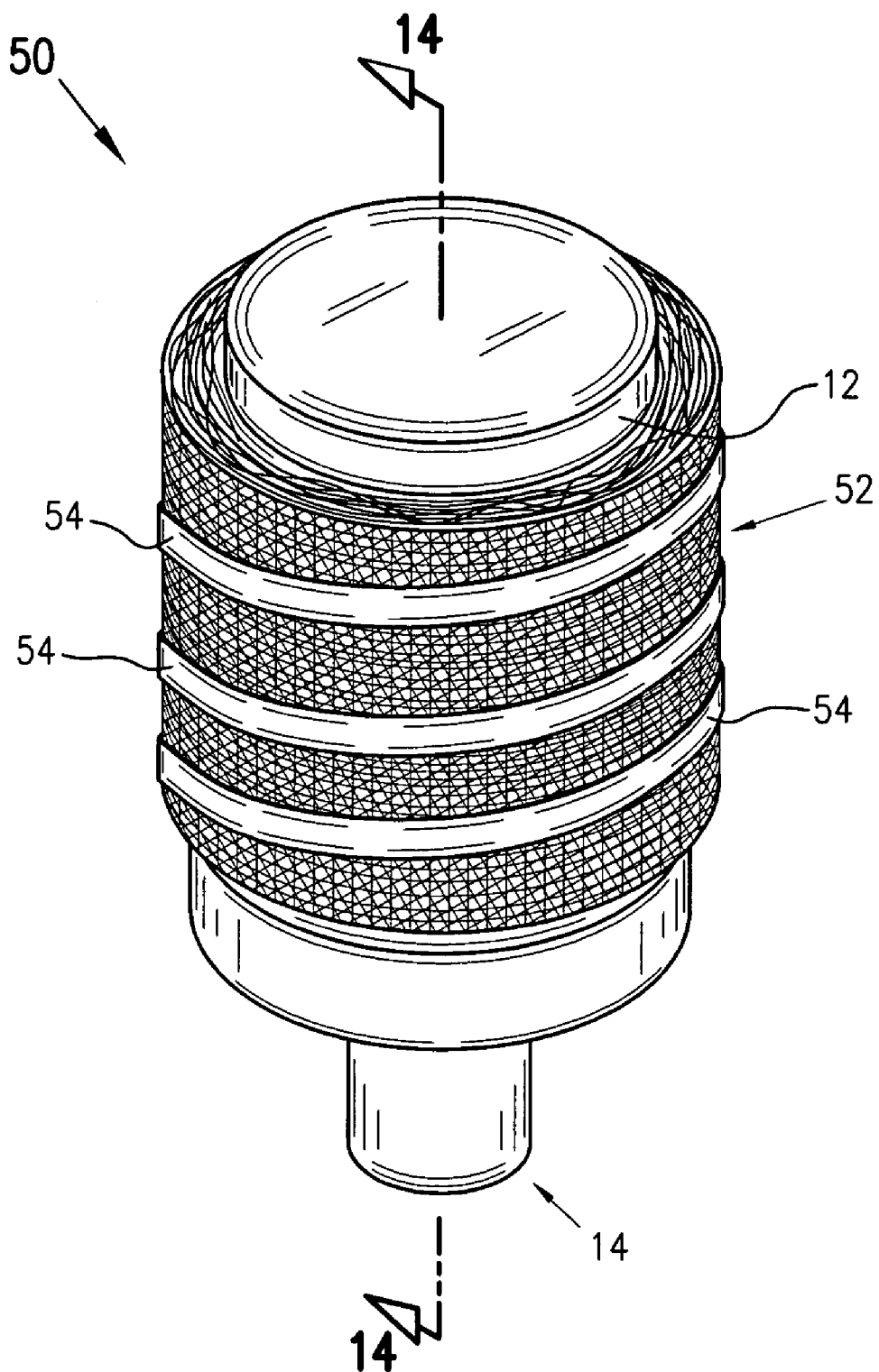
FIG. 13 is a perspective view of an alternative embodiment of a diffuser according to the present invention.
Figure 14:
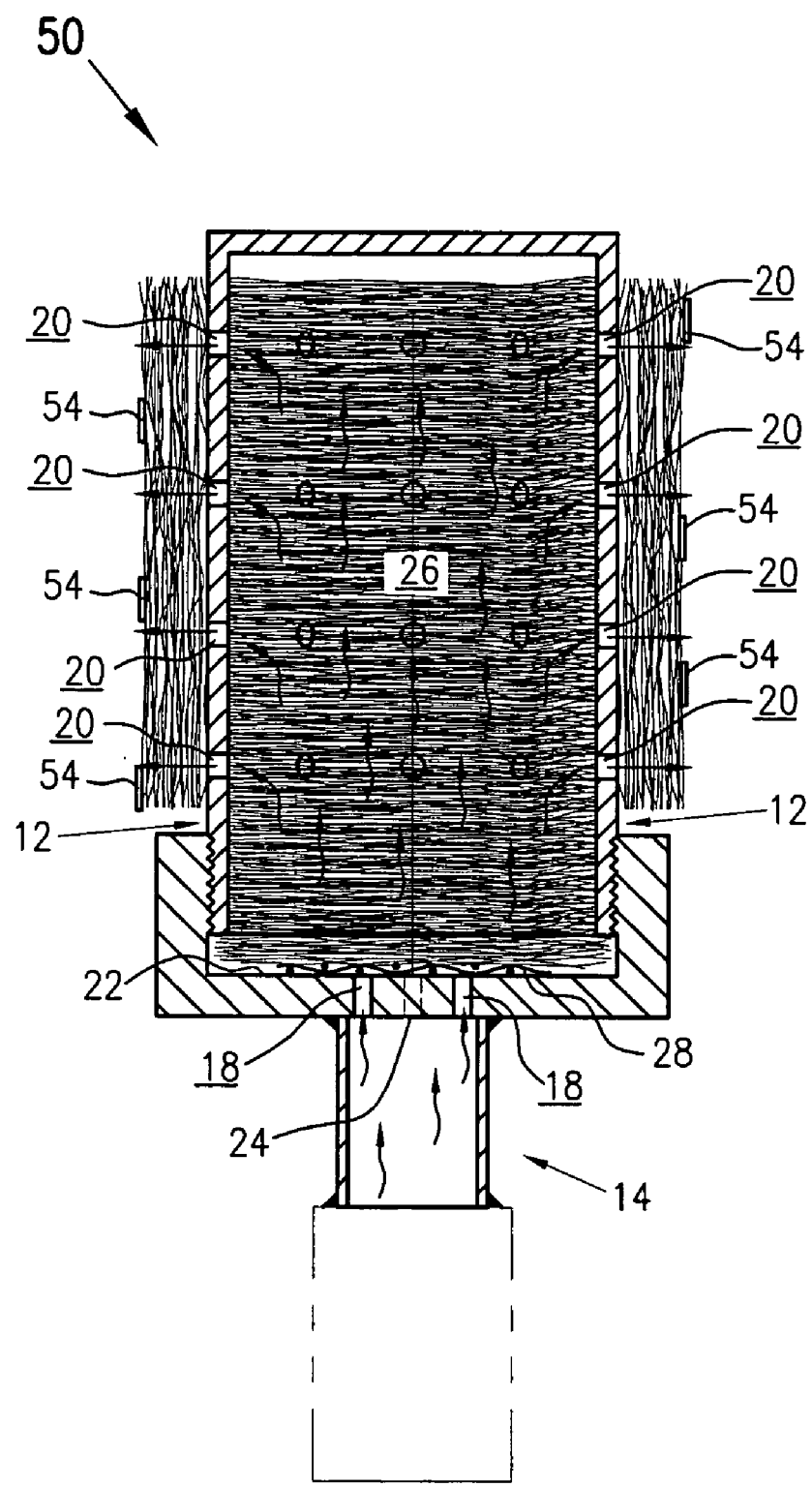
FIG. 14 is an exploded view of the diffuser of FIG. 13.
Figure 15:
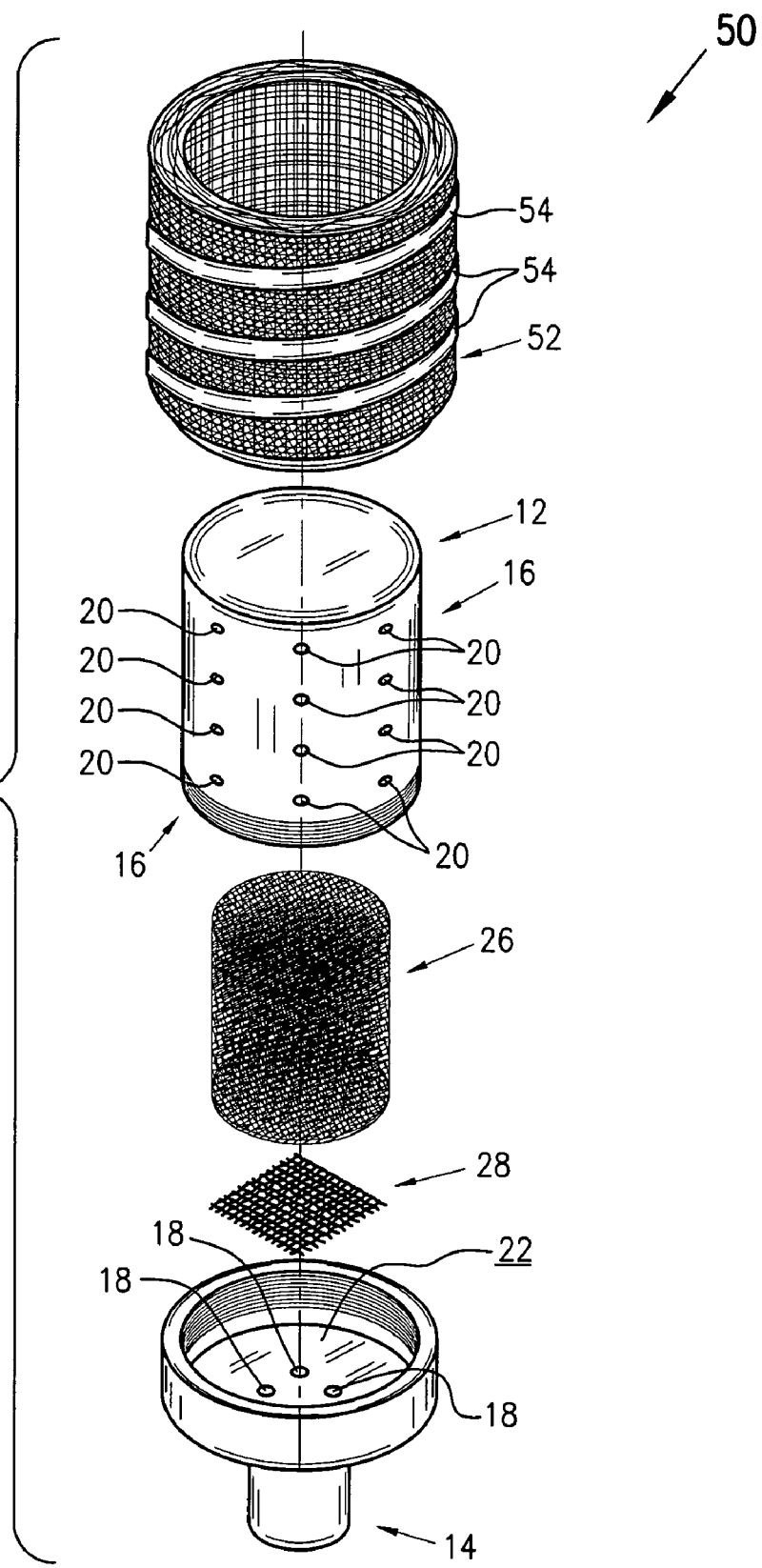
FIG. 15 is a cross-sectional view of the diffuser of FIG. 13 taken generally along line 15—15.

Referring now to FIGS. 13–15, other embodiments of the present invention may be adapted to comprise layered, knitted wire mesh secured about the outer surface of the housing for additional noise attenuation benefits. As shown in FIGS. 14 and 16, noise reducing device 50 broadly comprises housing 12, which has an inlet end 14 and an outlet end 16. In this embodiment, however, outlet end 16 comprises the cylindrical side walls of the housing whose cylindrical surface comprises a plurality of outlet orifices 20 disposed therein. Inlet end 14 and outlet 16 end are operatively arranged to be rotatably fastened to one another by means of threads. Similar to the other embodiments of the present invention, housing 12 operatively secures diffusing pack material 26 therein along with one or more stiffener means 28. Additionally, inlet end 14 comprises a plurality of inlet orifices 18 operatively arranged to maintain a backpressure upstream of the inlet orifices and the diffusing pack material is adapted to maintain contact with the outlet face of the inlet orifice. Outer layered, knitted wire mesh 52 comprises layered, knitted wire mesh that is wrapped about the outer cylindrical wall of the housing to cover orifices 20 and is secured thereto by one or more retaining means 54, which in this case comprises a banding material, preferably of a non-corrosive metal.

Tests of the noise reducing device of the present invention have resulted in noise reductions from approximately 130 dBa to approximately 80–84 dBa, which represents 10–15 dBa improvements over currently known configurations.

Thus, it is seen that the objects of the present invention are efficiently obtained, although modifications and changes to the invention should be readily apparent to those having ordinary skill in the art, which modifications are intended to be within the spirit and scope of the invention as claimed.

PARTS LIST

10 Noise reducing device
12 Housing
14 Inlet end
16 Outlet end
18 Inlet end orifice
20 Outlet end orifice
22 Outlet face
24 Inlet face
26 Diffusing pack material
28 Stiffener means
30 Fasteners
40 Alternative embodiment
50 Alternative embodiment
52 Outer layered knitted wire mesh
54 Retaining means

What is claimed is:

1. A noise reducing device for diffusing a pressurized gas comprising:
    a housing comprising an inlet end and an outlet end; said inlet end comprising a plurality of orifices and said outlet end comprising at least one orifice for passing said gas therethrough; said orifices of said inlet end operatively arranged to maintain a backpressure upstream of said inlet end;
    a diffusing pack material disposed within said housing, said diffusing pack material comprising layered, knitted wire mesh, wherein said mesh is layered perpendicular to said housing;
    at least one stiffener means; said stiffener means comprising wire screen layered perpendicular to said housing and disposed within said pack material, wherein said diffusing pack material maintains contact with said outlet end and said diffusing pack material obstructs said inlet end orifices and said outlet end orifice.

2. The noise reducing device of claim 1 wherein said layered, knitted wire mesh is resistant to oxidation and heat.

3. The noise reducing device of claim 1 wherein said layered, knitted wire mesh comprises stainless steel.

4. The noise reducing device of claim 1 wherein said wire screen is resistant to oxidation and heat.

5. The noise reducing device of claim 1 wherein said wire screen comprises stainless steel.

6. The noise reducing device of claim 1 wherein said inlet end orifices are operatively arranged to maintain a backpressure upstream of said inlet end greater than 5 psig.

7. The noise reducing device of claim 1 wherein said wire mesh comprises monofilament wire.

8. The noise reducing device of claim 7 wherein said mesh is folded upon itself to form a plurality of folded mesh layers.

9. The noise reducing device of claim 8 wherein said folded mesh layers are compressed against said outlet face to a density of between 35 and 45 pounds per cubic foot.

10. The noise reducing device of claim 9 further comprising stiffening means disposed within said folded mesh layers; said stiffening means operatively arranged to maintain the homogeneity of said diffusing pack material density.

11. The noise reducing device of claim 9 wherein said monofilament wire has a diameter between 0.006 and 0.011 inches.

12. The noise reducing device of claim 11 wherein said monofilament wire is resistant to oxidation.

13. The noise reducing device of claim 11 wherein said monofilament wire is heat resistant.

14. A noise reducing device for diffusing a pressurized gas comprising:
    a housing comprising an inlet end and an outlet end; said inlet end comprising a plurality of orifices and said outlet end comprising at least one orifice for passing said gas therethrough; said orifices of said inlet end operatively arranged to maintain a backpressure upstream of said inlet end;
    a first layer of knitted wire mesh aligned perpendicular to said housing; said first layer disposed proximate said inlet end and arranged to obstruct said inlet end orifices;
    a second wire screen layer; said wire screen layer aligned parallel and proximate said first layer;
    a third layer of knitted wire mesh aligned parallel with said second layer;
    a fourth wire screen layer; said fourth layer aligned parallel with said third layer disposed proximate said outlet end and maintaining contact therewith, wherein said fourth layer is arranged to obstruct said outlet end orifice.

15. The noise reducing device of claim 14 wherein said knitted wire mesh and said wire screen layers comprise stainless steel.

16. The noise reducing device of claim 14 wherein said inlet end orifices are operatively arranged to maintain a backpressure upstream of said inlet end greater than 5 psig.

17. The noise reducing device of claim 14 wherein said screen layers and said mesh layers form a diffusing pack material that maintains contact with an outlet face of said inlet end orifice, and said diffusing pack material obstructs said inlet end orifices and said outlet end orifice.

18. The noise reducing device of claim 14 wherein said folded mesh layers are compressed against said outlet face to a density of between 35 and 45 pounds per cubic foot.

19. The noise reducing device of claim 18 wherein said monofilament wire has a diameter between 0.006 and 0.011 inches.

* * * * *